United States Patent [19]

Sanjurjo et al.

[11] Patent Number: 4,612,179

[45] Date of Patent: Sep. 16, 1986

[54] PROCESS FOR PURIFICATION OF SOLID SILICON

[75] Inventors: Angel Sanjurjo, San Jose; Sylvia Pressacco, Palo Alto, both of Calif.

[73] Assignee: SRI International, Menlo Park, Calif.

[21] Appl. No.: 711,584

[22] Filed: Mar. 13, 1985

[51] Int. Cl.$^4$ .............................................. C01B 33/02
[52] U.S. Cl. ................................................... 423/348
[58] Field of Search ........................................ 423/348

[56] References Cited

U.S. PATENT DOCUMENTS

| | | | |
|---|---|---|---|
| 1,386,227 | 8/1921 | Becket | 423/348 |
| 3,148,131 | 9/1964 | Coursier | 423/348 |
| 3,933,981 | 1/1976 | Wakefield | 423/348 |

Primary Examiner—Peter D. Rosenberg

[57] ABSTRACT

A process is disclosed for producing silicon having a purity 99.999% or better which comprises contacting solid silicon at a temperature slightly below the melting point of silicon with a molten purifying agent which does not appreciably react with silicon to cause the impurities in the silicon to enter the molten material. After cooling, the purified silicon is separated from the purifying agent and the impurities therein by leaching.

25 Claims, 1 Drawing Figure

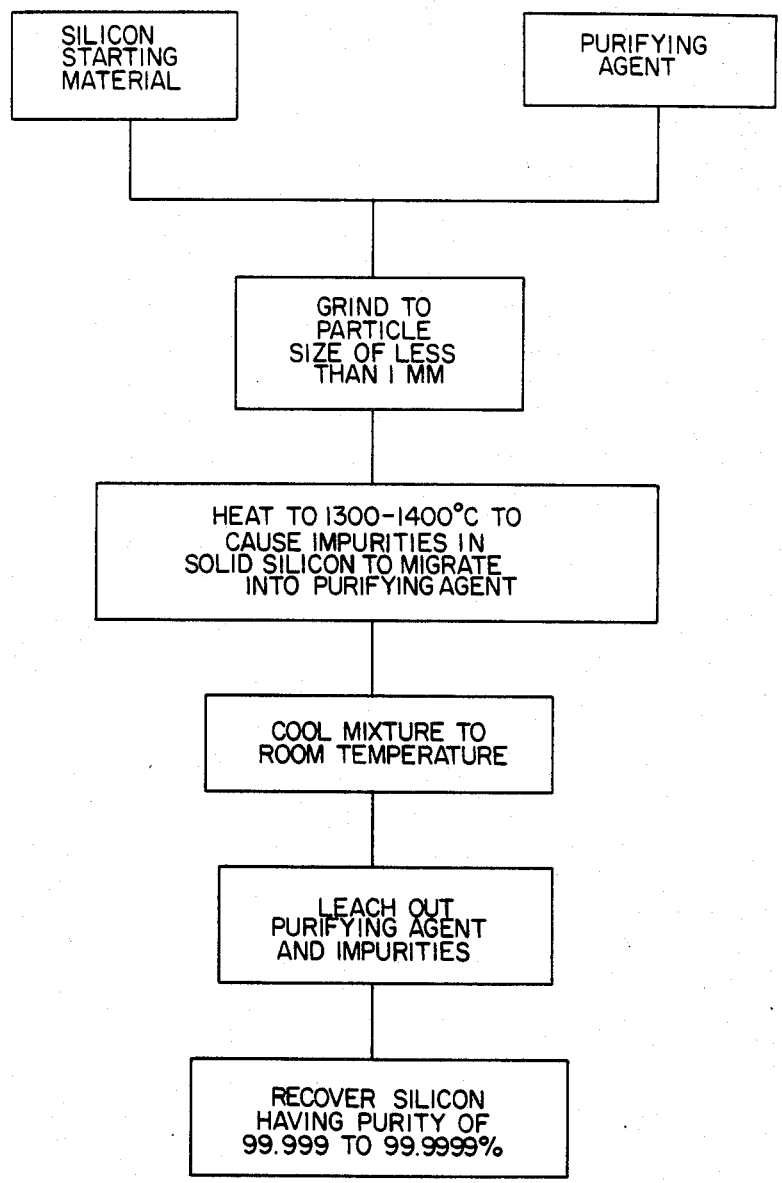

PROCESS FOR PURIFICATION OF SOLID SILICON

BACKGROUND OF THE INVENTION

1. Field of the Invention

This invention relates to a process for the purification of silicon. More particularly, this process relates to a process for purifying solid silicon which has been heated to a temperature slightly below the melting point of silicon while contacting the heated silicon with a purifying agent which does not appreciably react with the silicon.

2. Description of the Prior Art

An increasing demand for silicon of sufficiently high purity to be suitable for use in the semiconductor and solar cell industries has lead to investigation of many processes to achieve such purity levels. Such processes typically involve some sort of treatment of molten silicon. Purification of silicon in a molten state is, however, not new. For example, Allen U.S. Pat. No. 1,037,713 describes the purification of silicon by treating molten silicon with metals, such as alkali metals and alkaline earth metals including magnesium.

Brockbank U.S. Pat. No. 1,180,968 describes melting silicon under a slag of natural or artificial silica to eliminate impurities while Pacz U.S. Pat. No. 1,518,872 describes silicon as a valuable byproduct of a reaction between aluminum powder and a metallic fluorosilicate, such as magnesium fluorosilicate.

Pruvot et al U.S. Pat. No. 3,034,886 describes the purification of silicon or ferrosilicons by the injection of silicon fluoride gas into the liquid bath to react with aluminum and calcium impurities to form aluminum and calcium fluorides.

The use of molten metal fluorides for purification of silicon at a temperature of 1000°-1600° C. has been proposed by Coursier et al U.S. Pat. No. 3,148,131. The patentees, however, propose the use of metal fluorides which, in the main, either represent costly materials or materials known to react with silicon to form silicon fluoride and inject impurities in the silicon that are detrimental to its electronic properties.

Boulos U.S. Pat. No. 4,379,777 teaches passing powdered silicon through a plasma which apparently causes migration of the impurities to the surface of the molten silicon particles. After quenching, the particles are acid-leached to remove the surface impurities.

Kapur et al U.S. Pat. No. 4,388,286 combines vacuum refining of silicon with mixing the silicon with an effective fluxing agent, such as a fluoride of an alkali metal or an alkaline earth metal, to form a molten silicon phase and a slag phase.

One of us has also authored or coauthored papers which refer to the purification of molten silicon in contact with NaF in "Silicon Sheet for Solar Cells", by A. Sanjurjo published in the Journal of the Electrochemical Society, Volume 128, pp. 2244–2247 (1981) and "Fluxing Action of NaF on Oxidized Silicon", by L. Nanis, A. Sanjurjo, and S. Westphal published in Metallurgical Transactions B, Volume 12B, pp. 535–573 of the American Society for Metals and the Metallurgical Society of AIME (1981).

Not all prior purification processes, however, involve the melting of silicon. Ingle U.S. Pat. No. 4,172,883 discloses a process for purifying metallurgical grade silicon by heating it to 800 to 1350° C. and contacting it with silicon fluoride gas which is said to react with the impurities causing them to deposit out. The aforementioned Coursier et al patent also speaks of purification temperatures below the melting point of silicon.

It is also known to purify silicon by acid-leaching of silicon powder as well as by unidirectional solidification of silicon. Some of these processes are less expensive than the conventional method for obtaining high purity silicon from chlorosilane reduced —pyrolyzed in $H_2$ to produce pure polycrystalline silicon which can cost as much as 70 times the metalurgical grade silicon starting material. However, most of the other methods proposed either involve high costs or are of limited value in producing a very high purity silicon, such as needed for solar applications, i.e., a purity of 99.999 to 99.9999%.

In studying the thermodynamics of reactions between impurities in molten silicon versus the same impurities in solid silicon when contacted by certain materials, we have determined the surprising effect that reactions between impurities in solid silicon and certain materials are more favorable than reactions between the same impurities in molten silicon in contact with the same molten materials. Furthermore, we have found that the relative purification power of such materials for solid silicon with respect to liquid silicon can be even greater, if the solid silicon is crushed to expose the grain boundaries of adjacent grains in the polycrystalline silicon, apparently due to the tendency of the impurities to concentrate along the grain boundaries of adjacent crystals during solidification of the silicon.

SUMMARY OF THE INVENTION

It is, therefore, an object of the invention to provide a process for the purification of solid silicon to a purity of 99.999 or better.

It is another object of the invention to provide a process for the purification of solid silicon to a purity of 99.999 or better by heating the solid silicon to a temperature just below the melting point of silicon and contacting the heated silicon with a purifying agent which is substantially nonreactive with silicon.

It is yet another object of the invention to provide a process for the purification of solid silicon to a purity of 99.999 or better by heating the solid silicon to a temperature just below the melting point of silicon and contacting the heated silicon with a purifying agent which is substantially nonreactive with silicon and such that the impurities in the solid silicon migrate to this material.

It is a further object of the invention to provide a process wherein solid silicon is purified to 99.999 or better by heating it to just below the melting point of silicon while contacting the solid silicon with a purifying agent substantially nonreactive with silicon selected from the class consisting of silica, silicates of alkali metals and alkaline earth metals, and halides of alkali metals and alkaline earth metals.

These and other objects of the invention will be apparent from the description which follows.

In accordance with the invention, a process for producing silicon having a purity as high as 99.9999% comprises contacting solid silicon at a temperature slightly below the melting point of silicon with a molten purifying agent which does not appreciably react with silicon to cause the impurities in the silicon to enter the material.

BRIEF DESCRIPTION OF THE DRAWING

The sole figure is a flow sheet illustrating the process of the invention.

DESCRIPTION OF THE PREFERRED EMBODIMENTS

The process of the invention involves the initial provision of a source of silicon which is crushed into particulate form, heated to just below the melting point of the silicon, and then contacted at this temperature with a purifying agent which will extract the impurities without substantially reacting with the silicon, cooling the mixture, and then solubilizing the impurity rich purifying compound leaving silicon having a purity of 99.999 or better which is recovered by decantation and/or filtration.

The silicon used in the process may be an already partially purified silicon, or may be metallurgical grade silicon. Preferably, the silicon starting material should be at least 98-99% pure.

In accordance with a preferred embodiment of the invention, the silicon is crushed to a particle size range of equal to or smaller than 0.1 mm to 1 mm in at least one direction, i.e., smaller than the grain size in metallurgical grade silicon, to thereby expose most of the grain boundaries in which much of the impurities in the solid silicon will be concentrated.

Prior to the purification step, the particulate silicon may be optionally prepurified in an acid leaching step, for example, with an acid mixture, such as $HNO_3$—HF or $H_2O_2$—HF for a period of 10-60 minutes. The temperature may vary from room temperature to slightly under the boiling point of the acid mixture. If higher temperatures are used, the reaction time should be correspondingly shortened.

The silicon particles are mixed with the purifying agent in a ratio of from 0.1:2 to 2:1, preferably about 1:1. The purifying agent is selected to be a material which will react with the typical impurities found in silicon, such as iron and aluminum and, to a lesser extent, calcium, chromium, and nickel, but will be substantially nonreactive with silicon. By "substantially nonreactive" is meant that less than 0.01% will react with silicon at the purification temperature.

The purifying agent may comprise an oxide of silicon, including silicon oxide or a silicate or halide of lithium, sodium, potassium, magnesium, strontium, calcium, or barium which substantially is nonreactive with silicon. Especially preferred materials are $SiO_2$, NaF, and $Na_2SiO_3$ both because of their effectiveness and the material cost.

The purifying agent should be at least of reagent grade purity. However, in one embodiment, the purifying agent is preselected to contain a doping agent for the silicon in an amount to permit tailoring of the resistivity of the final purified silicon product.

The purifying agent is preferably ground to a particle size range approximating the particulate silicon to facilitate thorough mixing of the materials. The particulate silicon and purifying agent are then heated to a temperature of at least about 1300° C. and, preferably, to just under the melting point of silicon, i.e., just under 1420° C. By "just under the melting point of silicon" is meant about 1400°-1410° C.

The mixture is placed in a containment vessel which will not react with the silicon or cause impurities therein to migrate into the silicon at the purification temperature. Such a vessel may comprise a $SiO_2$, SiC or $Si_3N_4$ material or at least a vessel lined with one of these materials. A graphite vessel may also be used under certain circumstances where the carbon will not react with the silicon, e.g., in the presence of a NaF purifying agent.

The materials are held at the purification temperature for a period of time which may range from as short as 15 minutes to as long as 3 hours depending upon the reactivity of the purification agent. For example, when using $SiO_2$, such as silica gel, a time period of 3 hours may be used while NaF can be used for 15 minutes or $Na_2SiO_3$ for 30 minutes.

If the purifying agent is liquid, then it may be added and removed continuously until the desired purification has been achieved. In general, the mixture is then cooled to room temperature, and the now purified silicon is recovered by leaching the solidified mixture with a reagent which is a solvent for the impurity-rich purifying agent but which will not appreciably attack the silicon. Concentrated, or at least 5%, HF has been found to be a satisfactory leaching agent. The leaching agent should preferably be at least as pure as the final desired purity of the silicon to avoid introduction of contamination after the high temperature purification step. An electronic grade HF is satisfactory in a final leach although less pure, i.e., commercial grade, HF can be used in a first leach. After leaching, the purified silicon is recovered by separating the solid silicon from the now solubilized purification agent, such as by decantation or filtration.

After leaching, the purified silicon may be subject to a further purification step to remove sodium. This may be accomplished by heating the silicon in vacuum to a temperature of 800° C. or higher for about 5 to 60 minutes. Alternatively, the sodium may be oxidized and then the oxide layer removed by leaching in HF.

While we do not wish to be bound by any theories of operation, the success of our process appears to be related to the more negative partial chemical potential of impurities in liquid silicon than in solid silicon thus making the impurities more stable in liquid silicon. This phenomenon is typically used to explain why silicon can be purified by unidirectional solidification.

The process of the invention may also be operated on a continuous basis if desired wherein the silicon and purifying agent are continuously fed into a reactor as a particulate mixture and the treated materials continuously removed from the reactor. Alternatively, thin sheets or a ribbon of silicon can be used instead of crushed silicon particles. For example, silicon can be continuously fed through a pool of molten purifying agent thus permitting direct use of the purified silicon product in the manufacture of electronic devices, such as solar cells.

The following examples will serve to illustrate the process of the invention:

EXAMPLE I

Metallurgical grade silicon with a particle size of less than 1 mm was heated with an equal amount of spectrographic grade $SiO_2$ gel in a graphite crucible to 1360° C. for 180 minutes under an Ar atmosphere. After cooling to room temperature, the Si-$SiO_2$ mixture was leached with concentrated HF. The impurities (in parts per million) of the initial metallurgical grade silicon and the purified silicon are shown in Table 1.

TABLE I

|    | SiO$_2$ Gel | Silicon Before Treatment | Silicon After SiO$_2$ Treatment |
|----|-------------|--------------------------|-------------------------------|
| Mg | 20          | 35                       | <6                            |
| Ca | 15          | 40                       | 7                             |
| Ba | <10         | 17.5                     | 10                            |
| Ti | <12         | 250                      | 12                            |
| Zr | <35         | 75                       | <35                           |
| V  | <25         | 50                       | <25                           |
| Cr | <7          | 800                      | <7                            |
| Mo | <35         | —                        | —                             |
| Mn | <8          | 300                      | <8                            |
| Fe | <20         | 2800                     | <20                           |
| Ni | <8          | 30                       | 8                             |
| Cu | <4          | 80                       | 50                            |
| B  | <30         | <30                      | <30                           |
| Al | <10         | 1300                     | 100                           |
| P  | <4500       | <4500                    | <4500                         |

EXAMPLE II

The same silicon as in Example I was mixed with an equal amount of reagent grade Na$_2$SiO$_3$. The mixture was heated in a graphite crucible at 1360° C. for 30 minutes under an Ar atmosphere. After cooling, the mixture of Si-Na$_2$SiO$_3$ was leached with concentrated HF. The impurities (in parts per million) of the initial metallurgical grade silicon and the purified Si are shown in Table 2.

TABLE 2

|    | Silicon Before Treatment | Silicon After Na$_2$SiO$_3$ Treatment |
|----|--------------------------|---------------------------------------|
| Mg | 35                       | 17.5                                  |
| Ca | 40                       | 15                                    |
| Ba | 17.5                     | <10                                   |
| Ti | 250                      | <12                                   |
| Zr | 75                       | <35                                   |
| V  | 50                       | 25                                    |
| Cr | 800                      | <7                                    |
| Mn | 300                      | <8                                    |
| Fe | 2800                     | <20                                   |
| Ni | 30                       | 8                                     |
| Cu | 80                       | 80                                    |
| B  | <30                      | <30                                   |
| Al | 1300                     | 150                                   |
| P  | <4500                    | <4500                                 |

To illustrate that even higher purity levels can be achieved using this process when the starting materials are of higher purity, and that this process results in higher purification than conventional processing of liquid silicon, we performed the following experiments.

EXAMPLE III

Twenty grams of silicon powder (semiconductor grade from Ventron) were ground to a particle size of less than 1 mm and mixed with Ultrapure NaF (CERAC) of similar particle size in a weight ratio of 1:1. The mixture was placed in a graphite crucible and heated in a RF induction furnace for 15 minutes at 1300° C. so that the solid silicon was in contact with molten NaF. A second sample was heated at 1450° C. for 10 minutes to melt both the NaF and the silicon. The samples were then cooled to room temperature, and the silicon was separated from the NaF in each sample by aqueous leaching followed by decantation and filtering. The resulting purified silicon, as well as the original silicon and NaF and the final NaF product were analyzed by Spark Source Spectrography. The results, in parts per million, are listed in Table 3 below:

TABLE 3

|    | REACTANTS |         | PRODUCTS |           |               |
|----|-----------|---------|----------|-----------|---------------|
|    | Si        | NaF     | Si (Melted) | Si (Solid) | NaF (After Leach) |
| B  | 0.8       | 0.1     | 1        | 0.02      | 2             |
| P  | 0.3       | 1       | 0.2      | 0.05      | 0.1           |
| Al | 3         | 0.07    | 1        | 0.5       | 0.7           |
| As | <0.05     | 0.08    | 0.05     | <0.05     | <0.02         |
| Ti | ≦0.16     | <0.15   | <0.08    | <0.16     | <0.16         |
| Zr | <0.24     | <0.14   | <0.1     | <0.24     | 0.05          |
| V  | 0.04      |         | <0.04    | <0.04     |               |
| Cr | 0.2       | 0.08    | 1        | ≦0.2      | 0.4           |
| Mn | 0.4       | 0.06    | 2        | 0.04      | 1             |
| Fe | 40*       | 0.6     | 40*      | 3         | 4             |
| Ni |           | <0.2    |          |           | 0.2           |
| Cu | <0.1      | 0.06    |          | 0.07      | 0.5           |
| Na | ≦0.1      |         | 820      | 6         |               |
| K  |           | 4       | <0.04    | <0.04     | 0.2           |
| Ca | 7         | 0.5     | 0.4      | 4         | 1             |
| Mg | 6         | <2      | 5        | 2         | 2             |

*heterogeneous

Having thus described the invention, what is claimed is:

1. A process for purifying silicon comprising:
   heating solid silicon to a temperature below the melting point of silicon;
   contacting said heated solid silicon with a purifying agent which is substantially nonreactive with silicon; and
   causing the impurities in the silicon to enter the purifying material.

2. The process of claim 1 where said temperature is from 1300° to 1410° C.

3. The process of claim 2 wherein the temperature is from 1350°–1410° C.

4. The process of claim 1 wherein said solid silicon is in particulate form having an average particle size with at least 1 dimension smaller than 1 mm.

5. The process of claim 4 wherein the silicon is ground to an average particle size of less than 1 mm.

6. The process of claim 4 including the step of prepurifying said particulate silicon in an acid leach.

7. The process of claim 1 wherein said purifying agent is selected from the group consisting of silica; a silicate of lithium, sodium, potassium, magnesium, strontium, calcium, or barium; a halide of lithium, sodium, potassium, magnesium, strontium, calcium or barium; or mixtures thereof.

8. The process of claim 7 wherein said purifying agent is SiO$_2$.

9. The process of claim 7 wherein said purifying agent is selected from the class consisting of silicates of lithium, sodium, or potassium.

10. The process of claim 7 wherein the purifying agent is selected from the group consisting of a fluoride or chloride of lithium, sodium, potassium, magnesium, strontium, calcium, or barium.

11. The process of claim 1 wherein said silicon and purifying agent are heated in a vessel having a material in contact with said silicon which is substantially nonreactive with the silicon at the purification temperature.

12. The process of claim 1 wherein the steps of the process are repeated at least 1 additional time to increase the purity of the final silicon product.

13. The process of claim 1 wherein a mixture of particles of silicon and purifying agent are continuously fed into a reactor and the heat treated materials are continuously removed.

14. The process of claim 1 wherein said purifying agent is provided with a doping agent in a predetermined amount to tailor the resistivity of the final silicon product.

15. The process of claim 1 wherein said silicon is provided in a thin sheet which is passed through a molten bath of said purifying agent whereby the purified silicon sheet may be used directly in the manufacture of an electronic device, such as a solar cell.

16. The process of claim 1 wherein said silicon is provided in a thin sheet and the purifying agent is added to the sheet and the sheet is then continuously heat treated to purify the silicon.

17. The process of claim 1 wherein residual sodium in the purified silicon is subsequently removed.

18. The process of claim 17 wherein said residual sodium is removed by heating the silicon to a temperature of at least 600° C. in vacuum.

19. The process of claim 17 wherein said residual sodium is removed by oxidizing the silicon and removing the oxide layer by leaching in HF.

20. A process for purifying silicon comprising:
contacting solid silicon at a temperature of at least 1300° C. but below the melting point of silicon with a purifying agent selected from the group consisting of silica; a silicate of lithium, sodium, potassium, magnesium, strontium, calcium, or barium; a halide of lithium, sodium, potassium, magnesium, strontium, calcium, or barium, or mixtures thereof; and
causing the impurities in the silicon to enter the purifying material; and separating said purifying agent from said purified silicon.

21. The process of claim 20 wherein said solid silicon is in particulate form having an average particle size of less than 1 mm.

22. The process of claim 20 wherein the steps of the process are repeated at least 1 additional time to increase the purity of the final silicon product.

23. The process of claim 20 wherein residual sodium in the purified silicon is subsequently removed.

24. A process for purifying silicon comprising:
(a) providing solid silicon in particulate form having an average particle size of less than 1 mm.;
(b) prepurifying said solid silicon in an acid leach;
(c) heating said silicon to a purification temperature of at least 1300° C. but below the melting point of silicon in a vessel having a material in contact with said silicon which is substantially nonreactive with the silicon at said purification temperature;
(d) contacting said heated solid particulate silicon in said vessel with a purifying agent selected from the group consisting of silica; a silicate of lithium, sodium, potassium, magnesium, strontium, calcium, or barium; a halide of lithium, sodium, potassium, magnesium, strontium, calcium, or barium; or mixtures thereof;
(e) causing the impurities in the silicon to enter the purifying material; and
(f) separating said purifying agent from said purified silicon.

25. The process of claim 24 which further includes repeating steps c, d, e, and f at least 1 additional time to increase the purity of the final silicon product.

* * * * *